United States Patent [19]

Hanabusa

[11] Patent Number: 5,258,434
[45] Date of Patent: Nov. 2, 1993

[54] FLAME-RETARDANT POLYBUTYLENE TEREPHTHALATE RESIN COMPOSITIONS AND MOLD PARTS FORMED THEREFROM

[75] Inventor: Kazuhito Hanabusa, Shizuoka, Japan

[73] Assignee: Polyplastics Co., Ltd., Osaka, Japan

[21] Appl. No.: 887,003

[22] Filed: May 22, 1992

[30] Foreign Application Priority Data

May 29, 1991 [JP] Japan .................. 3-125803

[51] Int. Cl.$^5$ .............................................. C08K 5/11
[52] U.S. Cl. ................... 524/310; 524/317; 524/373; 524/409; 524/410
[58] Field of Search ............... 524/373, 410, 411, 310, 524/317, 409, 114

[56] References Cited

U.S. PATENT DOCUMENTS

| | | | |
|---|---|---|---|
| 3,909,485 | 9/1975 | Hongo et al. | 523/460 |
| 3,965,212 | 6/1976 | Kamada et al. | 523/460 |
| 4,338,243 | 7/1982 | Hecht et al. | 524/411 |
| 4,530,953 | 7/1985 | Yoshida . | |
| 4,548,964 | 10/1985 | Yoshida et al. | 524/310 |
| 4,562,216 | 12/1985 | Kishida et al. | 524/373 |
| 4,732,921 | 3/1988 | Hochberg et al. | 524/410 |
| 5,021,495 | 6/1991 | Minnick | 524/410 |

FOREIGN PATENT DOCUMENTS 0226189  6/1987  European Pat. Off. .
0421307A2  4/1991  European Pat. Off. .
2375312  7/1978  France .

OTHER PUBLICATIONS

DATABASE WPIL; Week 9118, Derwent Publications Ltd., London, G: AN 91-130213 & JP-A-3 070 767 (Toray Ind Inc) Mar. 26, 1991.

*Primary Examiner*—Veronica P. Hoke
*Attorney, Agent, or Firm*—Nixon & Vanderhye

[57] ABSTRACT

A flame-retardant polybutylene terephthalate resin composition, suitable for use as a support structure for an electrical contact includes (A) 100 parts by weight of a polybutylene terephthalate base resin having an intrinsic viscosity of 0.75 to 1.5 dl/g; (B) between 1 to 50 parts by weight of a halogenated phenoxy compound; (C) between 0.1 to 30 parts by weight of an antimony compound containing antimony pentaoxide and an alkali metal oxide; (D) between 0.01 to 10 parts by weight of a fatty acid ester of a polyhydric alcohol, and optionally (E) an inorganic filler.

9 Claims, No Drawings

FLAME-RETARDANT POLYBUTYLENE TEREPHTHALATE RESIN COMPOSITIONS AND MOLD PARTS FORMED THEREFROM

FIELD OF THE INVENTION

The present invention generally relates to a flame-retardant moldable polybutylene terephthalate (PBT) resin compositions and to molded parts formed therefrom. More particularly, the present invention in preferred forms is embodied in moldable PBT resin compositions which do not inhibit the long term electrical contact characteristics of electrical components (such as relays, switches and the like) with which the PBT composition is used.

BACKGROUND AND SUMMARY OF THE INVENTION

Polybutylene terephthalate (PBT) is a well known crystalline thermoplastic engineering resin due to its excellent mechanical and electrical properties, as well as its physical and chemical characteristics. PBT is thus widely used as an engineering resin in a variety of fields including component parts for the automotive, electrical and electronic appliance industries, and the like.

PBT resins have conventionally been used in components for end-use applications which demand flame-retardant properties, such as molded parts for use with electrical and electronic components. In this regard, flame-retardant PBT compositions have typically been prepared by blending a PBT base resin with an organic halogenated flame retardant, such as decarbromodiphenyl ethers or brominated polycarbonate oligomers, either alone or with an inorganic auxiliary flame retardant such as antimony trioxide. However, such conventional flame-retardant PBT resin compositions are problematic when used in close association with an electrical contact of an electrical or electronic component (e.g. as occurs when the PBT composition is used as a support structure for the electrical contact). That is, conventional flame-retardant PBT resin compositions tend to generate a relatively large amount of gaseous compounds during long-term and/or high-temperature service which reduces the contact characteristics of the electrical component with which the composition is used.

The reasons why such "off-gassing" problems occur is presumed to be that, when conventional PBT compositions are heated during molding and/or when molded articles made from the compositions are used in high-temperature environments, the PBT base resin, flame retardants and/or decomposition products are carbonized virtue of a slight arc occurring with the electrical contact. As a result, these carbonized materials release gaseous compounds which are thought to adhere to the contact thereby promoting its corrosion.

In order to solve the problems noted above, brominated bisimides, brominated epoxy oligomers and the like have been proposed as flame retardants for PBT compositions. However these brominated flame retardants still yield insufficient results, even though PBT compositions containing them exhibit much less of an off-gassing problem. In addition, the use of brominated epoxy oligomers creates other problems in that the viscosity of the resulting composition increases during its molding residence time resulting in poor melt-flow characteristics.

Techniques to inhibit the thermal decomposition of PBT resins by adding phenols, amines or phosphorus compounds have been also proposed. However, PBT resin compositions containing such compounds do not exhibit satisfactory performance characteristics when used to support electrical contacts, even though such compositions generate reduced amounts of a gas in service.

What has been needed in the art, therefore, are flame-retardant PBT compositions which exhibit minimal (if any) off-gassing characteristics which could thus be used successfully as support components or the like for electrical contacts. It is toward fulfilling such a need that the present invention is directed.

Broadly, the present invention is embodied in moldable flame-retardant PBT resin compositions which include (A) a PBT resin, (B) a halogenated phenoxy compound having a number-average degree of polymerization of 6 to 30, (C) an alkali metal oxide-containing antimony pentaoxide compound, (D) a fatty acid ester of a polyhydric alcohol, and optionally (E) an inorganic filler material. More specifically, preferred embodiments of the present invention will include:

(A) 100 parts by weight of a polybutylene terephthalate base resin having an intrinsic viscosity of 0.75 to 1.5 dl/g;

(B) between 1 to 50 parts by weight of a halogenated phenoxy compound which, exclusive of chain-terminating groups, is composed of repeating units represented by the general formula (1) and having a number-average degree of polymerization of 6 to 30:

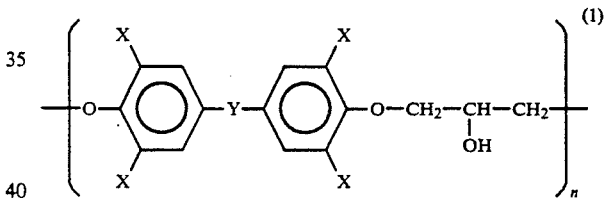

wherein X represents a bromine or chlorine atom; and Y represents alkylene having 1 to 10 carbon atoms, alkylidene, cycloalkane, carbonyl, —O—, —S— or —SO$_2$—;

(C) between 0.1 to 30 parts by weight of an antimony compound containing both antimony pentaoxide and an alkali metal oxide as constituents;

(D) between 0.01 to 10 parts by weight of a fatty acid ester of a polyhydric alcohol; and (E) between 0 to 150 parts by weight of an inorganic filler material.

DETAILED DESCRIPTION OF THE PREFERRED EXEMPLARY EMBODIMENTS

The polybutylene terephthalate base resin that is used in the compositions of the present invention is most preferably the polycondensation reaction product of 1,4-butanediol with terephthalic acid or a lower alcohol ester thereof. The polybutylene terephthalate base resin may also be a copolymer containing polybutylene terephthalate units in an amount of 70% by weight or above. The monomers that may be copolymerized include dibasic acids (other than terephthalic acid or lower alcohol ester thereof), for example, aliphatic and aromatic polybasic acids such as isophthalic acid, naphthalenedicarboxylic acid, adipic acid, sebacic acid, trimellitic acid and succinic acid and ester-forming derivatives thereof; and aromatic hydroxycarboxylic acids such as hydroxybenzoic acid and hydroxynaphthoic acid and ester-forming derivatives thereof; glycols (other than 1,4-butanediol), for example, conventional alkylene glycols such as ethylene glycol, diethylene glycol, propylene glycol, trimethylene glycol, hexamethylene glycol, neopentyl glycol and cyclohexxanedimethanol; lower alkylene glycols such as 1,8-octanediol; aromatic alcohols such as bisphenol A and 4,4'-dihydroxybiphenyl; adducts of bisphenol A with alkylene oxides such as adduct thereof with two ethylene oxide molecules and adducts thereof with two propylene oxide molecules; and polyhydroxyl compounds such as glycerin and pentaerythritol and ester-forming derivatives thereof.

Any polybutylene terephthalate prepared by the polycondensation of monomers selected from among those described above can be used as the PBT base resin component (A) according to this invention either alone or as a mixture of two or more of the same. However, use of polybutylene terephthalate or a mixture comprising the same as a main component is preferred. Furthermore, PBT branched polymers falling into the category of PBT copolymers may be used. The term "PBT branched polymer" as used herein and in the accompanying claims is meant to refer to a polybutylene terephthalate or polyester mainly composed of butylene terephthalate units which has a branch formed by the addition of a polyfunctional compound. The polyfunctional compound that may be used in the preparation of the PBT branched polymer includes trimesic acid, trimellitic acid and pyromellitic acid and alcohol esters thereof; glycerin, trimethylolethane, trimethylolpropane, pentaerythritol and so forth.

It is essential that the PBT resin which is used in the compositions of the present invention have an intrinsic viscosity of 0.75 to 1.5 dl/g, more preferably 0.8 to 1.2 dl/g and most preferably 0.8 to 1.0 dl/g as determined in o-chlorophenol at 30° C. When the intrinsic viscosity is lower than 0.75 dl/g, the evolution of a gas such as tetrahydrofuran from the PBT resin will not be sufficiently depressed. On the other hand, intrinsic viscosities in excess of 1.5 dl/g will result in poor fluidity characteristics during molding.

The halogenated phenoxy compound that is added to the PBT base resin in the present invention is preferably an oligomeric compound represented by the general formula (1) above, and which can be prepared, for example, by reacting a halogenated bisphenol glycidyl either with a halogenated bisphenol in the presence of a suitable catalyst, if necessary, in a solvent.

The halogenated biphenol compound constituting the halogenated phenoxy compound represented by the general formula (1) includes 2,2-bis(3,5-dibromo-4-hydroxyphenyl)propane, bis(3,5-dibromo-4-hydroxyphenyl)methane, bis(3,5-dibromo-4-hydroxyphenyl)-phenylmethane, 1,1-bis(3,5-dibromo-4-hydroxyphenyl)ethane, bis(3,5-dibromo-4-hydroxyphenyl)sulfone, bis(3,5-dibromo-4-hydroxyphenyl)ether, bis(3,5-dibromo-4-hydroxyphenyl)ketone, bis(3,5-dibromo-4-hydroxyphenyl)sulfide, 2,2-bis(3,5-dicholor-4-hydroxyphenyl)propane, bis(3,5-dicholor-4-hydroxyphenyl)methane, bis(3,5-dicholor-4-hydroxyphenyl)sulfone, bis(3,5-dichloro-4-hydroxyphenyl)sulfide and the like. Especially preferred is 2,2-bis(3,5-dibromo-4-hydroxyphenyl)propane (generally called tetrabromobisphenol A). An unhalogenated bisphenol compound such as 2,2-bis(4-hydroxyphenyl)propane, bis(4-hydroxyphenyl)sulfone or bis(4-hydroxyphenyl)methane may be used together with the halogenated phenoxy compound described above.

The halogenated phenoxy compound to be used in the compositions of the present invention will typically have terminal glycidyl and/or hydroxyl groups. The terminal groups, however, may be blocked with a carboxylic acid, phenol, amine, alcohol or the like.

The halogenated phenoxy compound has a number-average degree of polymerization of 6 to 30, preferably 10 to 25, and most preferably 10 to 20. When the degree of polymerization is lower than 6, the resulting composition will exhibit poor residence stability during molding thereby generating excessive amounts of gas. As a result, when the composition is extruded, significant deposits will be formed on the inside of the extruder thus necessitating frequent cleaning. On the contrary, when the degree of polymerization exceeds 30, the preparation of the composition by extrusion will be difficult owing to its excessively high melt viscosity.

The amount of the halogenated phenoxy compound to be added according to the present invention is between 1 to 50 parts by weight, preferably between 5 to 30 parts by weight, per 100 parts by weight of the polybutylene terephthalate base resin. When the amount of the halogenated phenoxy compound is less than 1 part by weight, insufficient flame-retardant effects will be realized, while its presence in amounts exceeding 50 parts by weight will result in the flame-retardant composition exhibiting poor mechanical and thermal properties.

The antimony compound to be used as component (C) in the compositions of the present invention is one containing both antimony pentaoxide ($Sb_2O_5$) and an alkali metal oxide ($M_2O$) as constituents, preferably one containing antimony pentaoxide and an alkali metal oxide at a molar ratio of between 1:0.1 and 1:0.8 and having an antimony pentaoxide structure. The metal constituting the alkali metal oxide includes lithium, sodium, potassium, rubidium, cesium and the like, among which sodium and potassium (especially sodium) are preferable in terms of cost.

The antimony compound can be prepared, for example, by a process which includes:

(a) dispersing sodium antimonate in water, adding 0.5 to 20% by weight (based on sodium antimonate) of an organic base or a salt thereof and adding 1.5 to 5 times by equivalent as much mono- or di-basic inorganic base as sodium antimonate to the resulting mixture to conduct a reaction, thus forming an antimony pentaoxide gel;

(b) recovering this gel by filtration, washing it with water, dispersing the gel in water, and aging the obtained dispersion at 50° to 100° C., and (c) adding an alkali metal hydroxide and/or an alkali metal salt to the resulting dispersion, filtering the obtained mixture, followed by drying and pulverizing the obtained solid.

Drying of the obtained solid may be conducted from room temperature to 500° C. For example, the product prepared by drying at 270° C. or below contains 4 to 16% of water as water of crystallization. The antimony compound will be in the form of a powder having a mean particle diameter of between 0.5 to 50 $\mu$m.

It is preferred that the antimony compound used in the compositions of this invention be one forming a slurry having a pH of 6 to 10, and more preferably a pH of 7 to 9, when dispersed in water. When the pH of the slurry is 6 or below or exceeds 10, decomposition of the PBT resin will be accelerated, so than an increased amount of off-gassing will occur.

The antimony compound is used in amounts between 0.1 to 30 parts by weight, preferably 0.5 to 20 parts by weight, per 100 parts by weight of the polybutylene terephthalate base resin. When the antimony compound is present in an amount less than 0.1 part by weight, the flame retardance of the PBT resin will not significantly be improved. If it exceeds 30 parts by weight, on the other hand, the mechanical properties of the resin will be impaired.

The compositions of the present invention are especially characterized by the presence and specific amounts of at least one fatty acid ester of a polyhydric alcohol (which will be described in greater detail below) in addition to the polybutylene terephthalate base resin, halogenated phenoxy compound, and antimony compound discussed previously. By melt-blending such four necessary components together, a composition can be provided which exhibits excellent flame retardance and well-balanced mechanical characteristics, generates gas in extremely reduced amounts during melt-processing and during service, and is improved in dispersibility, mold release properties and fluidity. Surprisingly, these benefits ensue notwithstanding the fact that PBT resin compositions containing components (B) and (C) are generally problematic in such respects.

The fatty acid ester of a polyhydric alcohol employed in the compositions of this invention include esters of polyhydric alcohols such as glycerin, pentaerythritol or sorbitan with a fatty acid such as lauric acid, palmitic acid and stearic acid or a hydroxy fatty acid.

The polyhydric alcohol constituting the ester is preferably at least one member selected from among ethylene glycol, polyethylene glycol, propylene glycol, glycerin and pentaerythritol. The fatty acid constituting the fatty acid ester is preferably one having at least 12 carbon atoms such as lauric acid, oleic acid, palmitic acid, stearic acid, behenic acid, montanic acid, hydroxystearic acid and hydroxybehenic acid. Preferably, a fatty acid having 16 to 35 carbon atoms is used.

When an ester prepared from a fatty acid having less than 12 carbon atoms is used, the resulting composition will not exhibit sufficient mold release properties and will also have poor heat-resistance characteristics.

Examples of the fatty acid ester to be used in the present invention include ethylene glycol monopalmitate, ethylene glycol dipalmitate, ethylene glycol monostearate, ethylene glycol distearate, ethylene glycol monobehenate, ethylene glycol dibehenate, ethylene glycol mntanate, ethylene glycol dimontanate, glycerin monopalmitate, glycerin dipalmitate, glycerin tripalmitate, glycerin monostearate, glycerin distearate, glycerin tristearate, glycerin monohydroxystearate, glycerin monobehenate, glycerin dibehenate, glycerin tribehenate, glycerin monohydroxybehenate, pentaerythritol monopalmitate, pentaerythritol dipalmitate, pentaerythritol tripalmitate, pentaerythritol tetrapalmitate, pentaerythritol monostearate, pentaerythritol distearate, pentaerythritol tristearate, pentaerythritol monohydroxystearate, pentaerythritol monobehenate, pentaerythritol dibehenate, pentaerythritol tribehenate, pentaerythritol tetrabehenate, pentaerythritol monohydroxybehenate, pentaerythritol monomontanate, pentaerythritol dimontanate, pentaerythritol trimontanate and pentaerythritol tetramontanate. These fatty acid esters may be used either alone or as mixtures which include two or more such fatty acid esters.

The fatty acid esters can be prepared by any conventional process. It is preferable that the fatty acid ester have at least one hydroxyl group in its molecule. By controlling the ratio of hydroxyl groups to ester groups, the composition can be "engineered" to have a satisfactory balance between molded properties (such as melt-fluidity and mold-release properties) and gas evolution.

The fatty acid ester is preferably a fatty acid ester of glycerin or pentaerythritol, and more preferably a mono- or di-ester of glycerin or pentaerythritol with stearic or behenic acid. The benefits of the present invention can, however, be attained by using any of the esters described above.

The fatty acid ester is present in the compositions of this invention in amounts between 0.01 to 10 parts by weight, more preferably between 0.1 to 5 parts by weight, and most preferably between 0.5 to 3 parts by weight. When the fatty acid ester component is used in amounts less than 0.01 part by weight, little improvements are obtained in terms of moldability and off-gassing. If it exceeds 10 parts by weight, however, the composition's mechanical properties will be adversely affected.

An inorganic filler material may optionally be incorporated into the compositions of this invention and is effective to produce a molded article having enhanced mechanical strength, heat resistance, dimensional stability (resistance to deformation and warpage) and electrical properties. The filler material may be selected from among fibrous, powdery and flaky ones depending upon the object.

Examples of fibrous fillers, include inorganic fibrous materials, for example, fibers of glass, carbon, silica, silica/alumina, zirconia, boron nitride, silicon nitride, boron and potassium titanate, and fibers of metals such as stainless steel, aluminum, titanium, copper and brass. Among the, glass fibers and carbon fibers are most representative. Furthermore the fibrous filler material may also include high-melting organic fibrous materials, for example, polyamide and acrylic resins.

Preferred powdery filler materials include carbon black, silica, quartz powder, glass bead, glass powder, silicates such as calcium silicate, aluminum silicate, kaolin, talc, clay, diatomaceous earth and wollastonite, metal oxides such as iron oxide, titanium oxide, zinc oxide and alumina; metal carbonates such as calcium carbonate and magnesium carbonate; metal sulfates such as calcium sulfate and barium sulfate; silicon carbide, silicon nitride, boron nitride, various powders and so forth.

Flaky filler materials may include mica, glass flakes, and various metal foils.

The inorganic filler materials may be used alone or as a mixture of two or more of the same. The simultaneous use of a fibrous filler (particularly glass fiber) with a powdery or flaky filler is particularly effective in producing an article which is exceptional in mechanical strength as well as desirable dimensional accuracy and electrical properties.

If necessary, these fillers may be used together with a sizing agent or a surface treatment, examples of which include functional compounds such as epoxy compounds, isocyanate compounds, silane compounds and titanate compounds. These compounds may be preliminarily applied to the filler or added during preparation of the composition.

According to the present invention, the optional inorganic filler material may be added to the composition in amounts up to 150 parts by weight. If used, the filler material will more preferably be present in amounts between 5 to 100 parts by weight, per 100 parts by weight of the polybutylene terephthalate resin. When the amount exceeds 150 parts by weight, the processing of the resulting composition during molding will be difficult and the molded article which is obtained will be problematic in terms of its mechanical strength. The polyfunctional surface treatment, if used, may be simultaneously added to the compositions in amounts up to 10% by weight and preferably between 0.05 to 5% by weight based on the weight of the inorganic filler.

The compositions of the present invention may also contain minor amounts of other thermoplastic resins, provided that the benefits achieved by the present invention are not hindered or marked. Examples of such thermoplastic resins include ethylene-acrylate copolymers, polyamides, polyacetals, polystyrenes, styrene-butadiene copolymers, sytrene-butadiene-acrylonitrile copolymers, styrene-butadiene-acrylic acid (or its ester) copolymers, styrene-acrylonitrile copolymers, polycarbonates, polyurethanes, polyphenylene oxides, polyphenylene sulfides, polybutadienes, halogenated polyolefins, polyvinyl halides, butyl rubbers and multi-phase graft polymers comprising polyacrylate as a main component. These resins may be used in amounts as desired to achieve desired property characteristics.

The compositions of the present invention may, of course, further contain known additives which are generally incorporated in thermoplastic resins in order to impart desired characteristics to the composition, specific examples of such additives including slip additives (other than those described above), mold release agents, lubricants, colorants such as dyes and pigments, plasticizers, crystallization accelerators, nucleating agents, stabilizers such as antioxidants, heat stabilizers and ultraviolet absorbers, and antistatic agents.

The compositions of the present invention can easily be prepared by any conventional process for the preparation of a resin composition using conventional processing equipment. For example, the compositions can be prepared by mixing the components together followed by melt-kneading and pelletizing the obtained mixture on an extruder and then molding the obtained pellets. Alternatively, a number of differently formulated pelletized compositions may be mixed in advance of molding according to predetermined ratios with the resulting mixture being molded to form a molded article having the desired composition. As yet another alternative, the individual components may be fed directly into a molding machine. Furthermore, a portion of the resin components may be pulverized and mixed to form a powder with the other components, and thereafter adding the remainder of the composition so as to obtain a homogeneous blend.

As is apparent from the discussion above, the moldable flame-retardant polybutylene terephthalate resin compositions of the present invention which are prepared by melt-blending a polybutylene terephthalate base resin (having a specified intrinsic viscosity), a halogenated phenoxy compound (having a specified degree of polymerization), a specified antimony compound and a specified fatty acid ester exhibits excellent moldability properties. Molded articles exhibiting exceptional flame retardance and minimal off-gassing during practical service can thus be obtained. As a result, surfaces of electrical contacts are minimally stained with deposits even after prolonged use and in contact with the compositions of this invention. Accordingly, the compositions can be used advantageously in the production of electrical and electronic parts and automobile components.

EXAMPLES

The present invention will now be described specifically by referring to the following non-limiting Examples. Each composition was evaluated in the Examples for various characteristics using the following techniques:

(1) Gas Evolution

Pellets having a composition specified in Table 1 were injection-molded into an ASTM tensile test piece which was thereafter pulverized, and used as a sample. 5 grams of the sample were allowed to stand in a 20-ml head space at 150° C. for one hour to determine by gas chromatography the amount of gas generated by the sample. The amount (weight) of the gas generated was shown in ppm based on the weight of the sample. The conditions of the determination were:
equipment: HP5890A
column: HR-1701, 0.32 mm$\phi$×30 cm
column temperature: 50° C. (1 min)−5° C./min−250° C. (1 min)
detector: FID (2) Fluidity (Bar Flow Length)

Pellets having a composition specified in Table 1 were molded into a thin test piece (5 mm side×0.5 mm thick) on a molding machine under the following conditions to determine the flow length (the length of the mold filled with the resin). The fluidity of the composition was evaluated based on the determined flow length.

Molding Conditions cylinder temperature: 260° C.
injection pressure: 750 kg/cm$^2$
mold temperatures: 60° C.

(3) Metal Corrosiveness (Deposits)

20 grams of pellets having a composition specified in Table 1 and a silver plate were put in a stopper 100-ml glass bottle. The stopper bottle was allowed to stand at 150° C. for 500 hours, after which the surface of the silver plate was visually observed and qualitatively evaluated according to the following ranks:

Corrosion (deposit)

⊚... no deposit.
○... slight deposit,
△... thin deposit over the whole surface,
X ... thick deposit over the whole surface.

(4) Flame Retardance Test (UL-94)

Five test pieces (thickness: 1/32 inch) were examined for flame retardance according to Underwriter's Laboratories, Subject 94 (UL94).

EXAMPLES 1 TO 7 AND COMPARATIVE EXAMPLES 1 TO 10

Compositions having formulations specified in Table 2 with respect to the Examples and Table 3 with respect to the Comparative Examples were prepared using the components listed in Table 1 and evaluated. The results are given in Tables 2 and 3.

Each composition was prepared as follows: polybutylene terephthalate (A) was blended with each of the components (B), (C) and (D) in the specified amount. The obtained blend was homogeneously mixed on a V-blender and then melt-extruded on a twin-screw extruder having a diameter of 30 mm at a barrel temperature of 260° C. while feeding a specified amount of glass fibers through an extruder side port. The strands extruded through a discharge die were cooled and cut into pellets.

TABLE 1

| | No. | Properties |
|---|---|---|
| Polybutylene terephthalate | A-1 | polybutylene terephthalate having an intrinsic viscosity of 0.8 |
| | A-2 | polybutylene terephthalate having an intrinsic viscosity of 0.9 |
| | A-3 | polybutylene terephthalate having an intrinsic viscosity of 1.0 |
| | A'-1 | polybutylene terephthalate having an intrinsic viscosity of 0.7 |
| Flame retardant | B-1 | halogenated phenoxy compound having a structure of the following general formula (2) and an average degree of polymerization of 12 |
| | B-2 | halogenated phenoxy compound having a structure of the following general formula (2) and an average degree of polymerization of 18 |
| | B'-1 | brominated polycarbonate oligomer having an average molecular weight of 2000 |
| Auxiliary flame retardant | C-1 | antimony compound comprising $Sb_2O_5$ and $Na_2O$ ($Sb_2O_5:Na_2O:H_2O = 1:0.7:0.5$ (by mol)) |
| | C-2 | antimony compound comprising $Sb_2O_5$ and $Na_2O$ ($Sb_2O_5:Na_2O:H_2O = 1:0.5:4.0$ (by mol)) |
| | C'-1 | $Sb_2O_5$ |
| Fatty acid ester | D-1 | glycerin monobehenate |
| | D-2 | pentaerythritol monostearate |
| | D-3 | propylene glycol monostearate |
| | D'-1 | stearyl stearate |

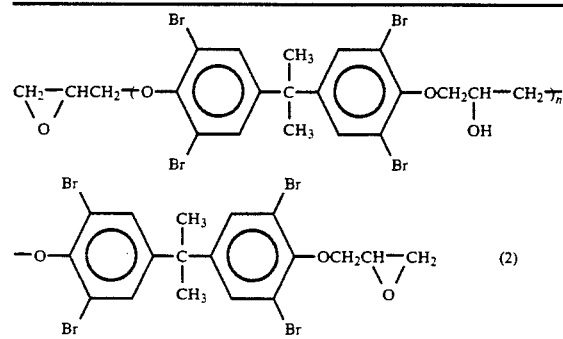

(2)

TABLE 2

| | | | | Example | | | | | | |
|---|---|---|---|---|---|---|---|---|---|---|
| | | | | 1 | 2 | 3 | 4 | 5 | 6 | 7 |
| Composition | (A) | polybutylene terephthalate | kind | A-1 | A-1 | A-2 | A-2 | A-2 | A-2 | A-3 |
| | | | pt. wt. | 100 | 100 | 100 | 100 | 100 | 100 | 100 |
| | (B) | halogenated phenoxy compound | kind | B-1 | B-2 | B-2 | B-2 | B-2 | B-2 | B-1 |
| | | | pt. wt. | 22.0 | 22.0 | 22.0 | 22.0 | 22.0 | 22.0 | 22.0 |
| | (C) | antimony compound | kind | C-1 | C-1 | C-1 | C-2 | C-2 | C-2 | C-1 |
| | | | pt. wt. | 10.0 | 10.0 | 10.0 | 10.0 | 10.0 | 10.0 | 10.0 |
| | (D) | fatty acid ester | kind | D-1 | D-1 | D-1 | D-1 | D-2 | D-3 | D-2 |
| | | | pt. wt. | 2.0 | 2.0 | 2.0 | 2.0 | 2.0 | 2.0 | 2.0 |
| | (E) | glass fiber | pt. wt. | 58.0 | 58.0 | 58.0 | 58.0 | 58.0 | 58.0 | 58.0 |
| Qualities | | flame retardance | — | V-0 | V-0 | V-0 | V-0 | V-0 | V-0 | V-0 |
| | | fluidity | mm | 35 | 32 | 30 | 31 | 32 | 29 | 26 |
| | | amount of gas | ppm | 30 | 32 | 25 | 26 | 24 | 29 | 22 |
| | | corrosiveness against metal | — | ○ | ○ | ○ | ○ | ○ | ○ | ○ |

TABLE 3

| | | | | Comparative Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| Composition | (A) | polybutylene terephthalate | kind | A-1 | A-1 | A-1 | A-1 | A-1 | A-1 | A-1 | A-2 | A'-1 | A-2 |
| | | | pt. wt. | 100 | 100 | 100 | 100 | 100 | 100 | 100 | 100 | 100 | 100 |
| | (B) | halogenated phenoxy compound | kind | B-1 | B-1 | B-1 | B-1 | — | B'-1 | B-2 | B-2 | B-1 | B-2 |
| | | | pt. wt. | 22.0 | 22.0 | 22.0 | 22.0 | — | 22.0 | 22.0 | 22.0 | 22.0 | 22.0 |
| | (C) | antimony compound | kind | C-1 | C-1 | — | C'-1 | C-1 | C-1 | C-1 | C-2 | C-1 | C'-1 |
| | | | pt. wt. | 10.0 | 10.0 | — | 10.0 | 10.0 | 10.0 | 10.0 | 10.0 | 10.0 | 10.0 |
| | (D) | fatty acid ester | kind | — | D'-1 | D-1 | D-1 | D-1 | D-1 | — | — | D-1 | D-1 |
| | | | pt. wt. | — | 2.0 | 2.0 | 2.0 | 2.0 | 2.0 | — | — | 2.0 | 2.0 |
| | (E) | glass fiber | pt. wt. | 58.0 | 58.0 | 58.0 | 58.0 | 58.0 | 58.0 | 58.0 | 58.0 | 58.0 | 58.0 |
| Qualities | | flame retardance | — | V-0 | V-0 | HB | V-0 | HB | V-0 | V-0 | V-0 | V-0 | V-0 |
| | | fluidity | mm | 23 | 35 | 37 | 36 | 38 | 28 | 18 | 17 | 42 | 28 |
| | | amount of gas | ppm | 40 | 50 | 31 | 55 | 32 | 38 | 40 | 37 | 45 | 50 |
| | | corrosiveness against | — | ○ | ○ | ○ | X | ○ | ○ | ○ | ○ | ○ | X |

What is claimed is:

1. A moldable flame-retardant polybutylene terephthalate resin composition comprising:
   (A) 100 parts by weight of a polybutylene terephthalate base resin having an intrinsic viscosity of 0.75 to 1.5 dl/g;
   (B) between 1 to 50 parts by weight of a halogenated phenoxy compound which, exclusive of terminal groups, is composed of repeating units represented by the general formula (1) and having a number-average degree of polymerization of 10 to 25:

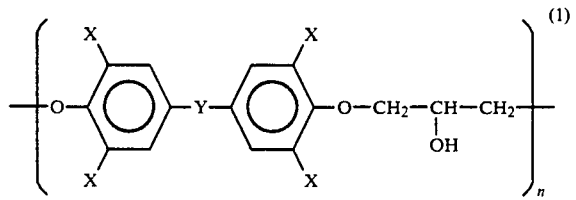
(1)

wherein X represents a bromine or chlorine atom; and Y represents alkylene having 1 to 10 carbon atoms, alkylidene, cycloalkane, carbonyl, —O—, —S— or —SO$_2$—;

(C) between 0.1 to 30 parts by weight of an antimony compound containing both antimony pentaoxide and an alkali metal oxide as constituents;
   (D) between 0.01 to 10 parts by weight of a fatty acid ester of a polyhydric alcohol; and
   (E) between 0 to 150 parts by weight of an inorganic filler material.

2. A moldable flame-retardant polybutylene terephthalate resin composition as in claim 1, wherein said antimony compound has an antimony pentaoxide structure and includes antimony pentaoxide and an alkali metal oxide at a molar ratio of between 1:0.1 and 1:0.8.

3. A moldable flame-retardant polybutylene terephthalate resin composition as in claim 1 or 2, wherein the polyhydric alcohol is ethylene glycol or propylene glycol.

4. A moldable flame-retardant polybutylene terephthalate resin composition as set forth in claim 1 or 2, wherein the polyhydric alcohol is glycerol or pentaerythritol.

5. A moldable flame-retardant polybutylene terephthalate resin composition as in claim 4, wherein said fatty acid ester includes a hydroxyl group.

6. A moldable flame-retardant polybutylene terephthalate resin composition as set forth in claim 1, wherein the fatty acid is one having 15 too 35 carbon atoms.

7. A moldable flame-retardant polybutylene terephthalate resin composition as set forth in claim 6, wherein the fatty acid is stearic acid or behenic acid.

8. A molded article consisting essentially of the polybutylene terephthalate resin compositions as in claim 1, 2, 6 or 7.

9. A molded article as in claim 8, wherein the molded article is a component for an electrical or electronic component.

* * * * *